(12) United States Patent
Shimizu et al.

(10) Patent No.: US 7,325,643 B2
(45) Date of Patent: Feb. 5, 2008

(54) REDUCTION GEAR DEVICE

(75) Inventors: Hiroaki Shimizu, Hyogo (JP);
Toshiyuki Hasegawa, Hyogo (JP)

(73) Assignee: Kanzaki Kokyukoki Mfg. Co., Ltd.,
Hyogo (JP)

( * ) Notice: Subject to any disclaimer, the term of this patent is extended or adjusted under 35 U.S.C. 154(b) by 474 days.

(21) Appl. No.: 11/026,104

(22) Filed: Jan. 3, 2005

(65) Prior Publication Data
US 2005/0145445 A1    Jul. 7, 2005

(30) Foreign Application Priority Data
Jan. 6, 2004   (JP) ............................. 2004-000829

(51) Int. Cl.
*B60K 17/00* (2006.01)
(52) U.S. Cl. ............... 180/346; 180/65.6; 180/344; 180/369; 180/370; 180/372; 180/374; 180/383; 180/385
(58) Field of Classification Search ............ 180/346, 180/65.5, 65.6, 65.7, 337, 344, 356, 363, 180/369, 370, 372, 374, 383, 385
See application file for complete search history.

(56) References Cited

U.S. PATENT DOCUMENTS

| | | | |
|---|---|---|---|
| 2,258,328 A * | 10/1941 | Lee et al. ................. 180/253 |
| 3,477,547 A * | 11/1969 | Kress et al. ................ 184/63 |
| 3,737,000 A * | 6/1973 | Knobloch et al. .......... 180/369 |
| 6,591,593 B1 | 7/2003 | Brandon et al. |
| 6,722,459 B1 * | 4/2004 | Wendl et al. .............. 180/65.5 |

\* cited by examiner

*Primary Examiner*—Eric Culbreth
(74) *Attorney, Agent, or Firm*—Sterne, Kessler, Goldstein & Fox P.L.L.C.

(57) ABSTRACT

There is provided a reduction gear device applied to a vehicle having a motor unit with a motor shaft for outputting a driving force for driving a driving wheel. The reduction gear device includes an input shaft operatively connected to said motor shaft; a reduction gear unit operatively connected to said input shaft; a brake disk supported by the input shaft in a relatively non-rotatable and axially movable manner; an operating member for pushing and moving the brake disk toward a braking surface; a housing for accommodating the reduction gear unit, the brake disk and the operating member; and a brake operating shaft which is supported rotatably about an axis by the housing along a radial direction of the brake disk and has an engagement part engaging with the operating member. In the reduction gear device, the engagement part of the brake operating shaft is in a non-circular shape in a cross-sectional view, in order that the operating member pushes and moves the brake disk despite the brake operating shaft being rotated in any direction about the axis.

15 Claims, 8 Drawing Sheets

REDUCTION GEAR DEVICE

BACKGROUND OF THE INVENTION

1. Field of the Invention

The present invention relates to a reduction gear structure applied to a vehicle having dedicated motor units and reduction gear devices for respective driving wheels.

2. Background Art

Conventionally, it is a well-known technique to provide dedicated motor units for respective driving wheels to secure a free space in the central part in the width direction of the vehicle. (See, for example, the specification of the U.S. Pat. No. 6,591,593. Hereinafter referred to as a cited reference.)

Particularly, the cited reference discloses a vehicle including: a pair of main frames; a pair of driving wheels, each of which is supported by each of the pair of main frames, respectively; and a pair of motor units, each of which drives each of the pair of driving wheels, respectively, in which a free space is secured between the pair of driving wheels.

In addition to the aforementioned configuration, the vehicle described in the cited reference further include a reduction device disposed between each of the pair of motor units and the driving wheel corresponding thereto, respectively.

With such reduction devices, a motor unit of a high-speed output type can be used, whereby torque for operating the motor units can be reduced.

In a vehicle in which a dedicated motor unit is provided for each driving wheel, a brake mechanism must be provided for each driving wheel. In other words, a dedicated brake mechanism must be provided between a motor unit and a driving wheel operatively driven by the motor unit. However, the cited reference does not clearly disclose this aspect.

Further, it is ideal for vehicle manufacturers that consideration has been made to enable motor units and reduction devices to be mounted without any limitation due to the dimensions and the shape of the main frames, and it is also desirable to easily complete such mounting operations. However, the cited reference does not clearly disclose these aspects as well.

BRIEF SUMMARY OF THE INVENTION

The present invention has been made in view of the aforementioned conventional art. An object of the present invention is to provide a reduction gear structure applied to a vehicle in which a dedicated motor unit is provided for each driving wheel and a reduction gear device disposed between the motor unit and the driving wheel is provided, the reduction gear structure having a simple configuration capable of effecting a braking function in addition to a reducing function.

Another object of the present invention is to provide a reduction gear structure capable of miniaturizing and simplifying an operating mechanism for the brake mechanism while achieving the aforementioned object.

Still another object of the present invention is to provide a reduction gear structure which can be mounted easily to a main frame and to which a motor unit can be mounted easily, without being limited by the dimensions and the shape of the main frame.

According to one aspect of the present invention, there is provided a reduction gear structure applied to a vehicle having a motor unit with a motor shaft for outputting a driving force for driving a driving wheel and a reduction gear device.

The reduction gear device includes an input shaft operatively connected to said motor shaft; a reduction gear unit operatively connected to said input shaft; a brake disk supported by the input shaft in a relatively non-rotatable and axially movable manner; an operating member for pushing and moving the brake disk toward a braking surface; a housing for accommodating the reduction gear unit, the brake disk and the operating member; and a brake operating shaft which is supported rotatably about an axis by the housing along a radial direction of the brake disk and has an engagement part engaging with the operating member.

In the reduction gear device, the engagement part of the brake operating shaft is formed into a non-circular shape in a cross-sectional view, in order that the operating member pushes and moves the brake disk according to the rotation of the brake operating shaft in any one of both directions about the axis.

According to this aspect, the brake disk is supported by the input shaft positioned on the upper stream side in the transmission direction than the reduction gear unit. This makes it possible to miniaturize the brake disk.

Further, the brake operating shaft is supported by the housing along the radial direction of the brake disk, and the engagement part of the brake operating shaft engaging with the operating member is formed into a non-circular shape in a cross-sectional view. This makes it possible to push and move the operating member toward the brake disk according to the rotation of the brake operating shaft in any one of both directions about the axis.

Accordingly, it is possible to simplify the link mechanism for operating the brake operating shaft. Further, it is possible to apply reduction gear devices formed of the same composing member to a right and left pair of driving wheels, respectively.

Preferably, the housing is supported by a side surface, facing a driving wheel, of a main frame that extends in a longitudinal direction of the vehicle. The motor unit is disposed opposite to the driving wheel across the main frame.

According to such a configuration, the reduction gear device and the motor unit can be connected to the main frame in a well-balanced manner.

More preferably, the brake operating shaft may extend in a substantially vertical direction so that an upper end thereof is positioned above the main frame in a state that the housing is supported by the main frame.

In the configuration, it is possible to let the arm for rotating the brake operating shaft about the axis extend in a direction separated from the corresponding driving wheel. Accordingly, it is possible to effectively prevent the arm and the link mechanism connected to the arm from interfering with the corresponding driving wheel.

Particularly, in a vehicle having a pair of right and left main frames and a pair of right and left driving wheels, the arm and the link mechanism can be disposed between the pair of main frames. Accordingly, it is possible to effectively prevent the arm and the link mechanism from colliding with the outer member.

For example, the reduction gear unit may be a planet gear unit having a sun gear operatively connected to the input shaft, a planet gear meshed with the sun gear so as to be able to revolve about the sun gear, a carrier which supports the planet gear in a relatively rotatable manner and revolves about the sun gear according to a revolution of the planet gear, and an internal gear meshed with the planet gear. In the configuration, the internal gear is a fixed element while the carrier is an output element.

According to this configuration, it is possible to miniaturize the reduction gear unit while obtaining a desired reduction ratio.

Preferably, an end surface in an axial direction of the internal gear may be used as the braking surface.

According to the preferable configuration, it is possible to further miniaturize the reduction gear unit, especially in an axial direction of the planet gear unit.

Preferably, at least one of the sun gear or the internal gear of the planet gear unit may be radially movable with respect to the axis of the planet gear unit.

According to this configuration, it is possible to equally distribute the load on the planet gear unit.

For example, the input shaft may include a hollow, first input shaft which is supported by the housing in a rotatable manner about an axis and into which the motor shaft is inwardly inserted from a first end side thereof in a relatively non-rotatable manner, and a second input shaft which has a first end side inwardly inserted into the first input shaft from a second end side of the first input shaft in a relatively non-rotatable manner, and a second end side positioned outward the first input shaft. In the configuration, the brake disk may be outwardly inserted onto the second end side of the first input shaft in a relatively non-rotatable manner, while the sun gear may be supported by the second end side of the second input shaft in a relatively non-rotatable manner or integrally formed therewith.

Preferably, the reduction gear device further includes an output member which rotates about an axis of the sun gear according to the revolution of the carrier.

The output member has a hollow part which is disposed substantially coaxially with the sun gear and into which a driving axle of the driving wheel is inwardly inserted in a relatively non-rotatable manner. The second end side of the second input shaft contacts an end surface of the driving axle in a state of being inwardly inserted into the hollow part.

According to the configuration, it is possible to prevent the second input shaft and the sun gear from being unintentionally moved in an axial direction.

According to another aspect of the present invention, there is provided a reduction gear structure applied to a vehicle having a main frame extending along a longitudinal direction of the vehicle, a driving wheel supported by the main frame, a motor unit with a motor shaft for outputting a driving force for driving the driving wheel and being disposed opposite to the driving wheel across the main frame, and a reduction gear device.

The reduction gear device includes an input shaft operatively connected to the motor shaft; a reduction gear unit operatively connected to the input shaft; and a housing for accommodating the reduction gear unit.

The main frame has an opening penetrating a first side surface facing a driving wheel and a second side surface opposite to the first side surface. The housing includes a motor connecting part with a diameter smaller than that of the opening of the main frame, and a frame mounting seat which is positioned outward in a radial direction of the motor connecting part and contacts the first side surface of the main frame. The motor unit includes a housing connecting part with a diameter smaller than that of the opening of the main frame, and a frame mounting seat which is positioned outward in a radial direction of the housing connecting part and contacts the second side surface of the main frame. One of the motor connecting part of the housing and the housing connecting part of the motor unit is formed into a convex shape, and the other is formed into a concave shape into which the one having the convex shape can be inserted.

According to another aspect, the housing and the motor unit are distributively disposed across the main frame. This makes it possible to support the reduction gear device and the motor unit in a well-balanced manner.

Further, an opening is formed in the main frame, and the motor connecting part of the housing and the housing connecting part of the motor unit are positioned inside the opening. This makes it possible to reduce the diametrical lengths of the frame connecting seat of the housing and the frame connecting seat of the motor unit. Therefore, it is possible to easily install on a main frame with a short vertical length of a small vehicle.

Further, one of the motor connecting part of the housing and the housing connecting part of the motor unit is formed into a convex shape, and the other is formed into a concave shape into which the one having the convex shape can be inserted. Thereby, it is possible to securely conform the rotating axis of the input shaft with the rotating axis of the motor shaft.

According to still another aspect of the present invention, there is provided a reduction gear structure applied to a vehicle having a main frame extending along a longitudinal direction of the vehicle, a driving wheel supported by the main frame, a motor unit having a motor shaft for outputting a driving force for driving the driving wheel, and a reduction gear device.

The reduction gear device includes an input shaft operatively connected to the motor shaft; a reduction gear unit operatively connected to the input shaft; and a housing for accommodating the reduction gear unit.

The main frame has an opening penetrating a first side surface facing a driving wheel and a second side surface opposite to the first side surface. The motor unit has a motor case supporting the motor shaft. The motor case includes a case body capable of being inserted into the opening, and a housing mounting seat disposed on an end of a side, facing the reduction gear unit, of the case body. The housing includes a frame mounting seat contacting the first side surface of the main frame, and a motor mounting seat which is positioned inward in a radial direction of the frame mounting seat and contacts the housing mounting seat.

According to still another aspect, it is possible that the reduction gear device is first connected to the motor unit, and then the connected assembly is mounted to the vehicle frame.

Accordingly, transmission manufacturers can perform manufacturing management handling completed driving mechanism assemblies in the state that reduction gear devices are connected to motor units. Further, car manufacturers have no need to procure motor units beforehand, and they only have to mount the driving mechanism assemblies (connected assemblies of motor units and reduction gear devices) supplied from transmission manufacturers to frames. This makes it possible to simplify the assembling operation of driving system.

BRIEF DESCRIPTION OF THE DRAWINGS/FIGURES

The above, and other objects, features and advantages of the present invention will become apparent from the detailed description thereof in conjunction with the accompanying drawings wherein.

DETAILED DESCRIPTION OF THE INVENTION

Embodiment 1

A preferred embodiment of a reduction gear structure according to the present invention will be described below with reference to the accompanying drawings.

Figure 1:
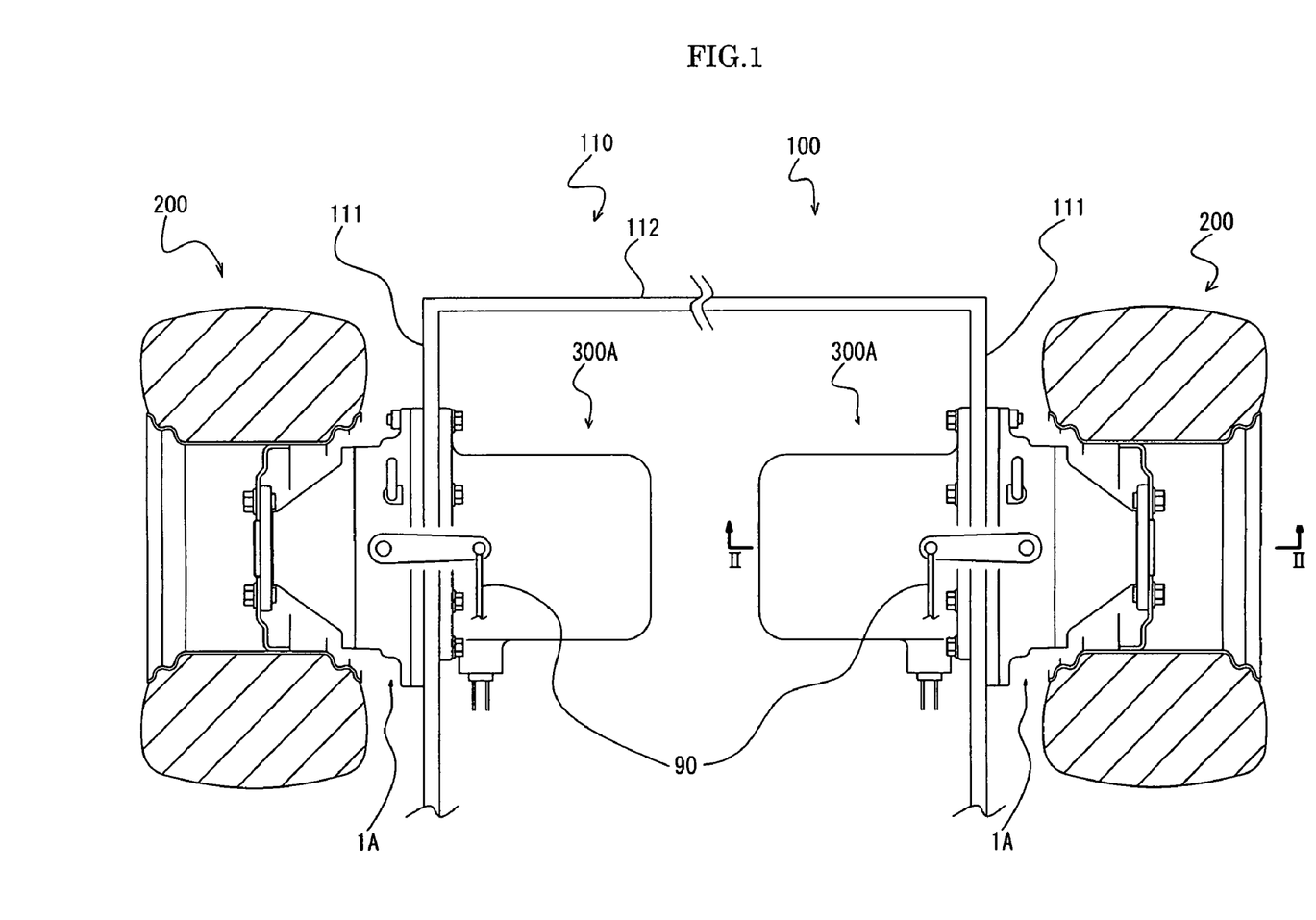
FIG. 1 is a plan view of a front part of a vehicle to which a reduction gear structure according to a preferred embodiment of the present invention.

FIG. 1 shows a plan view of a front part of a vehicle 100 to which a reduction gear structure of this embodiment is applied.

As shown in FIG. 1, an explanation will be given below by way of an example in which the reduction gear structure according to one embodiment of the present invention is applied to the vehicle 100 having: a right and left pair of main frames 111 extending along the longitudinal direction of the vehicle; a pair of driving wheels 200, each of which is supported by each of the pair of main frames 111; a pair of motor units 300A, each of which outputs a driving force to each of the pair of driving wheels 200; and a pair of reduction gear devices 1A respectively connecting to the pair of motor units 300A.

First, the outline configuration of the vehicle 100 will be described.

The vehicle 100 includes, as a vehicle frame 110, the pair of main frames 111, and first and second cross members 112, 113 for connecting the pair of main frames 111 with each other.

The first cross member 112 connects the front parts, in the longitudinal direction of the vehicle, of the pair of main frames 111 with each other (see FIG. 1).

On the other hand, the second cross member 113 connects the rear parts, in the longitudinal direction of the vehicle, of the pair of main frames 111 with each other (see FIGS. 6 and 7 described later).

In the vehicle 100 exemplary shown in this embodiment, the pair of driving wheels 200 are non-steering wheels disposed at front in the forward/backward direction of the vehicle. That is, the vehicle 100 is so configured that the front wheels thereof are non-steering driving wheels.

Figure 2:
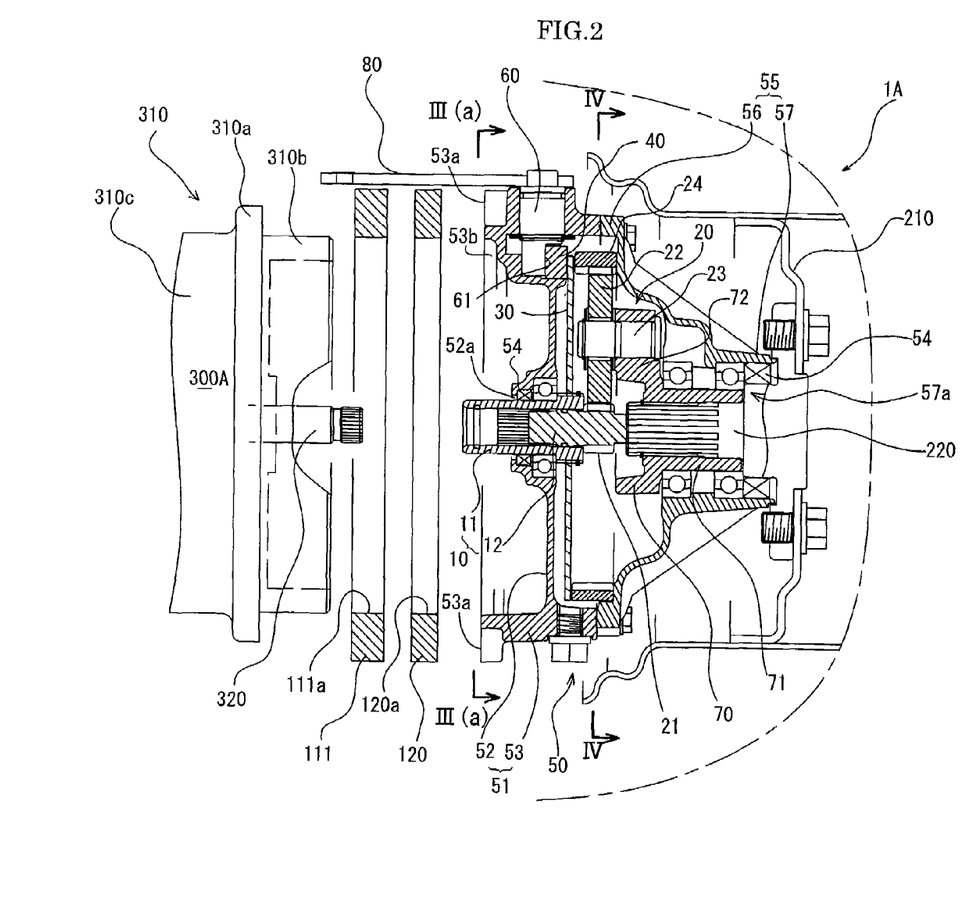
FIG. 2 is a sectional view taken along the line II-II in FIG. 1.

FIG. 2 shows a sectional view taken along the line II-II in FIG. 1.

As shown in FIGS. 1 and 2, each of the pair of driving wheels 200 is supported by a first side surface (hereinafter referred to as outside surface), facing outside in the vehicle width direction, of the corresponding main frame 111, respectively.

Particularly, each of the pair of driving wheels 200 includes a wheel 210 and a driving axle 220 connected to the wheel 210, respectively, and the driving axle 220 is connected to the reduction gear device 1A, which is connected to the outside surface of the main frame 111.

Each of the pair of motor units 300A is connected to a second side surface (hereinafter referred to as an inside surface), facing inside in the vehicle width direction, of the corresponding main frame 111, respectively.

That is, the pair of motor units 300A are disposed inside the vehicle frame 100 defined by the pair of main frames 111.

As shown in FIG. 2, each of the pair of motor units 300A has a motor shaft 320, respectively, so as to operatively drive the corresponding driving wheel 200 via the motor shaft 320.

Each of the pair of motor units 300A has a motor case 310 connected to the inside surface of the corresponding main frame 111, and the motor shaft 320 extending, substantially horizontally, outward in the vehicle width direction from the motor case 310.

Particularly, the main frame 111 has an opening 111a penetrating the inside surface and the outside surface.

The motor case 310 includes a body 310c, a frame mounting seat 310a and a housing connecting part 310b. The frame mounting seat 310a and the housing connecting part 310b are provided on the end portion facing the reduction gear device 1A (end portion positioned outward in the vehicle width direction) of the body 310c.

The housing connecting part 310b has a smaller diameter than that of the opening 111a of the main frame 111.

The frame mounting seat 310a is positioned outward in the radial direction of the housing connecting part 310b, and contacts the inside surface of the main frame 111.

In this embodiment, the housing connecting part 310b is arranged coaxially with the motor shaft 320, and is protruded to be fitted in the opening 111a of the main frame 111.

Preferably, the convex-shaped connecting part 310b have a little longer length axially than the length of combining the thickness of the main frame 111 and the thickness of a spacer 120 described later. That is, the tip part of the convex-shaped connecting part 310b is made to project outward from the spacer 120 when the frame mounting seat 310a contacts the inside surface of the main frame 111.

In this embodiment, the pair of motor units 300A are electric motors driven by a battery.

Particularly, the vehicle 100 includes an engine (not shown) supported by the vehicle frame 110, a generator (not shown) driven by the engine, and a battery (not shown) driven by the generator, and is so configured that the power is electrically transmitted from the battery to the pair of motor units 300A. Of course, the vehicle can be so configured that the power required here may be supplied by a fuel-cell, besides the battery.

Further, hydraulic motor units may be adopted as the pair of motor units 300A, of course.

Next, the reduction gear device 1A according to this embodiment will be described.

The reduction gear device 1A is disposed between the motor unit 300A and the driving wheel 200 driven by the motor unit 300A.

Particularly, the reduction gear device 1A includes: an input shaft 10 operatively connected to the motor shaft 320; a reduction gear unit 20 operatively connected to the input shaft 10; a brake disk 30 for operatively applying a braking force to a driving force transmitted from the motor shaft 320 to the driving axle 220; an operating member 40 for pushing and moving the brake disk 30 toward a braking surface; a housing 50 for accommodating the reduction gear unit 20, the brake disk 30 and the operating member 40; and a brake operating shaft 60 for operating the operating member 40.

The housing 50 is so configured as to be able to be connected to the outside surface of the corresponding main frame 111.

Figure 3:
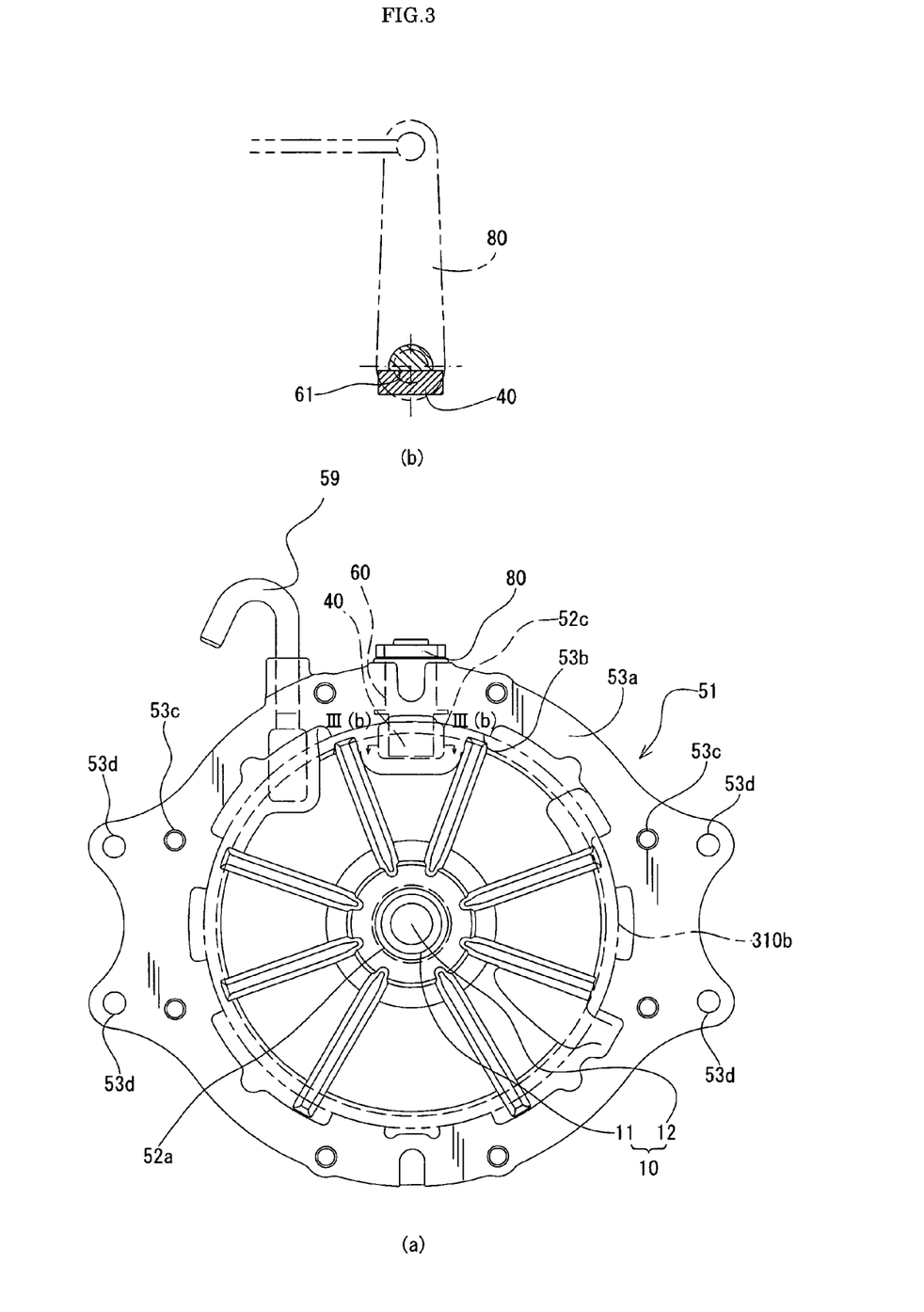
FIG. 3(a) is an end view taken along the line III(a)-III(a) in FIG. 2.
FIG. 3(b) is a partial sectional view taken along the line III(b)-III(b) in FIG. 3(a).

FIG. 3(*a*) shows an end view taken along the line III(a)-III(a) in FIG. 2, and FIG. 3(*b*) shows a partial sectional view taken along the line III(b)-III(b) in FIG. 3(*a*).

As shown in FIGS. 2, 3(*a*) and 3(*b*), the housing 50 includes an inside member 51 disposed so as to face the outside surface of the main frame 111, and an outside member 55 connected to the inside member 51. In the housing 50, the reduction gear unit 20, the brake disk 30, and the operating member 40 are accommodated in a space defined by the inside member 51 and the outside member 55.

Particularly, the inside member 51 includes a partition wall 52 extending substantially in parallel with the outside surface of the main frame 111, a peripheral wall 53 extending from the radially outer end part of the partition wall 52 in the vehicle width direction, and a frame mounting seat 53*a* integrally formed with an end part (end part located inward in the vehicle width direction) facing the motor unit 300A of the peripheral wall 53.

The partition wall 52 has an input shaft bearing hole 52*a* for bearing the input shaft 10, at the radially central part thereof.

The frame mounting seat 53*a* has an extended portion extending outward radially, and the extended portion is provided with a first connecting hole 53*d* (FIGS. 3(*a*) and 3(*b*)).

The first connecting hole 53*d* is used as a bolt insertion hole for fastening the inside member 51 to the main frame 111.

In this embodiment, as shown in FIG. 3, top and bottom pairs of first connecting holes 53*d*, four holes in total, are provided symmetrically at 180°.

The frame mounting seat 53*a* has, in its seat surface (a surface contacting the outside surface of the frame 111), a plurality of second connecting holes 53*c* arranged along a peripheral direction about the input shaft 10.

The second connecting hole 53*c* are used as bolt holes for fastening the inner member 51 to the main frame 111 with the motor unit 300A and the outside member 55.

Further, the inside member 51 has a motor connecting part 53*b* forming a connecting part with the motor case 310, at radially inner part of the frame mounting seat 53*a*.

In this embodiment, the motor connecting part 53*b* is in a concave shape in which the convex shape housing connecting part 310*b* can be fitted.

Particularly, the motor connecting part 53*b* has a recess arranged coaxially with the input shaft 10 so that the convex-shaped connecting part 310*b* of the motor case 310, protruding from the main frame 111 and the spacer 120 outwardly in the vehicle width direction, is in a concave-convex engagement with the recess.

Although, in this embodiment, the inside member 51 is connected to the main frame 111 in the state where the spacer 120 is interposed in between them as shown in FIG. 2, the spacer 120 may not be provided if the enough thickness of the frame 111 is ensured.

In the spacer 120, there is formed an opening 120*a* corresponding to the opening 111*a* formed in the main frame so that the convex shape housing connecting part 310*b* of the motor case 310 can be inserted in the openings 111*a* and 120*a*.

Preferably, the openings 111*a* and 120*a* are engaging holes conforming to the outer peripheral shape of the convex shape housing connecting part 310*b*, whereby the motor unit 300A can be positioned accurately with reference to the main frame 111.

Further, in this embodiment, the housing connecting part 310*b* of the motor case 310 and the motor connecting part 53*b* of the housing 50 are connected to each other via a concave-convex engagement in which the convex shape of one of the housing connecting part 310*b* and the motor connecting part 53*b* is inserted into the concave shape of the other of them as described above, whereby the axis of the motor shaft 320 and the axis of the input shaft 10 can conform with each other securely.

Of course, it is possible that the housing connecting part 310*b* of the motor unit 300A can be formed as a recess, and the motor connecting part 53*b* of the housing 50 can be formed as a protrusion, opposite to this embodiment.

The outside member 55 includes a peripheral wall 56 with the end surface abutting against the end surface of the peripheral wall 53 of the inside member 51, and an outer end wall 57 positioned at the outer end in the vehicle width direction of the peripheral wall 56.

In this embodiment, the outside member 55 is trumpet-shaped in a longitudinal sectional view, in which the peripheral wall 56 and the outer end wall 57 are continuously formed.

Figure 4:
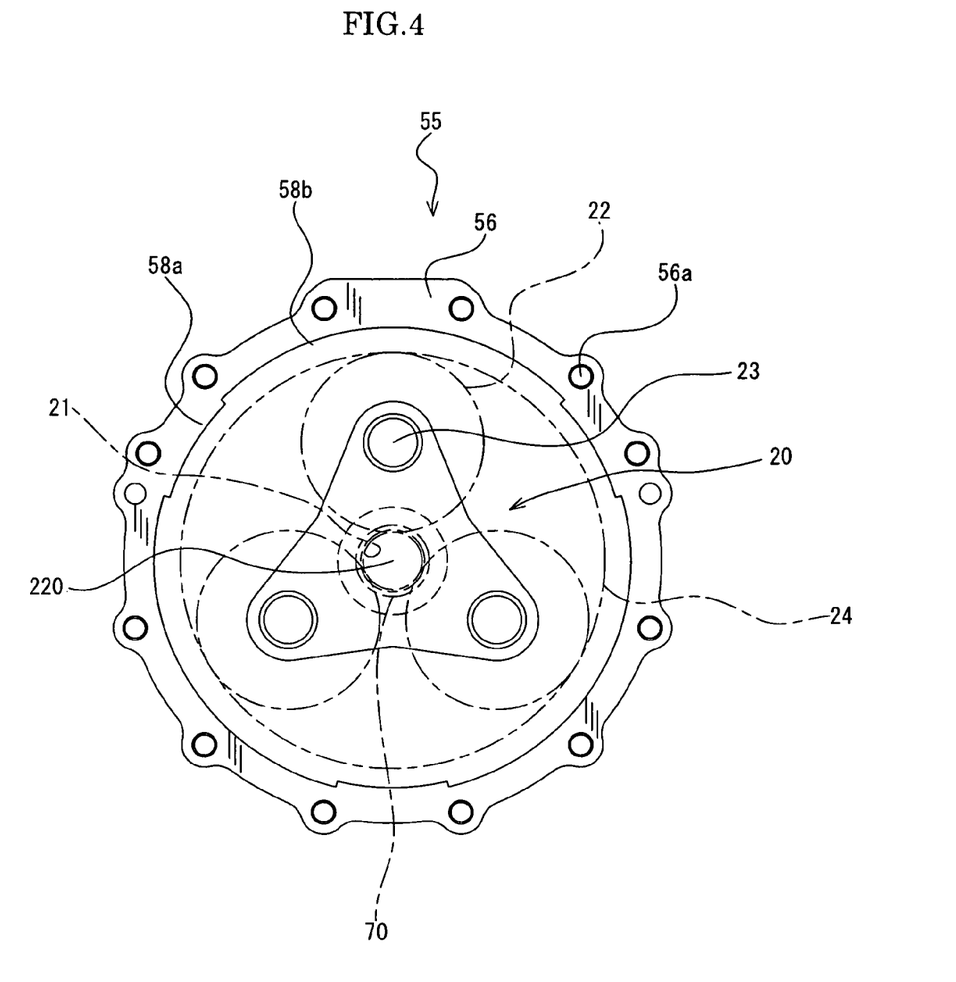
FIG. 4 is an end view taken along the line IV-IV in FIG. 2.

FIG. 4 shows an end view taken along the line IV-IV in FIG. 2.

As shown in FIG. 4, the peripheral wall 56 has connecting holes 56*a* corresponding to the second connecting holes 53*c* provided in the inside member 51.

As shown in FIG. 2, in the outer end wall 57, there is formed a axle bearing hole 57*a* for bearing the driving axle 220 of the corresponding driving wheel 200.

In this embodiment, the input shaft bearing hole 52*a* and the axle bearing hole 57*a* are formed coaxially in order that the motor shaft 320 of the motor unit 300A, the input shaft 10 and the driving axle 220 are disposed coaxially.

Further, in this embodiment, the housing 50 is so formed that the inner space thereof is liquid-tightly sealed, and a prescribed amount of oil is contained in the inner space.

The reference numeral 54 in FIG. 2 indicates a seal member for covering the input shaft bearing hole 52*a* to thereby liquid-tightly seal the inner space of the housing 50 against the outside, and the reference numeral 59 in FIG. 3(*a*) is a breathing pipe for opening an air layer in the upper part of the inner space of the housing to the atmosphere.

The reduction gear unit 20 may take various configurations, provided that it transmits the rotational input of the input shaft 10 to the driving axle 220 with reducing its rotational amount.

In this embodiment, a planet gear unit is adopted as the reduction gear unit 20 in order to save the space.

Particularly, the planet gear unit includes: a sun gear 21 operatively connected to the input shaft 10; planet gears 22 meshed with the sun gear 21 so as to revolve about the sun gear 21; a carrier 70 with pivot pins 23 supporting the planet gears 22 in a relatively rotatable manner and revolving about the sun gear 21 according to the revolution of the planet gears 22; and an internal gear meshed with the planet gears 22.

The internal gear 24 is a fixed element, and the carrier 70 is an output element.

In this embodiment, the internal gear 24 is formed as a separate member detachable from the housing 50, and is supported by the housing 50 circumferentially non-movably with reference to the axis of the sun gear 21.

Particularly, as shown in FIG. 4, the inner peripheral surface of the peripheral wall 56 of the housing is provided with recesses 58b defined by protrusions 58a protruded radially inwardly.

The internal gear 24 has an outer peripheral shape which engages with the protrusions 58a and the recesses 58b.

With such a configuration, the internal gear 24 is detachable from the housing 50, and is circumferentially non-rotatable in the state of being mounted to the housing 50.

Although the internal gear 24 is formed as a separate member from the housing 50 in this embodiment, the internal gear 24 may be formed integrally with the housing 50, of course.

In this embodiment, the carrier 70 is operatively connected to the driving axle 220.

In other words, the carrier 70 is made to rotate about the axis of the sun gear 21 in accordance with the revolution of the pivot pins 23.

Particularly, as shown in FIG. 2, the carrier 70 includes a hollow shaft 71 supported in a rotatable manner about the axis by the axle bearing 57a, and a flange 72 extending radially outwardly from the hollow shaft 71.

The flange 72 has through holes into which the pivot pins 23 are inserted.

The hollow shaft 71 is so formed that the driving axle 220 is inserted in the hollow hole in a relatively non-rotatable manner.

Particularly, the outer peripheral surface of the driving axle 220 has male splines, and the inner peripheral surface of the hollow shaft 71 has female splines, so that the driving axle 220 and the hollow shaft 71 are in a spline-connection.

The brake disk 30 is so configured as to apply a braking force to the transmission system transmitted from the motor shaft 320 to the driving axle 220.

In this embodiment, the brake disk 30 is supported by the input shaft in a relatively non-rotatable manner.

In other words, in this embodiment, the brake disk 30 is disposed so as to apply a braking force at a stage prior to a reduction performed by the reduction gear unit 20, whereby the required braking torque is reduced. This results in a miniaturization of the brake disk 30.

Further, the brake disk 30 is axially movable with reference to the input shaft 10, and is able to be pushed to the braking surface by the operating member 40.

In this embodiment, the end surface in the axial direction of the internal gear 24 is used as the braking surface as shown in FIG. 2, whereby the reduction gear device as a whole is miniaturized.

Of course, any part of the housing 50, for example, may be used as the braking surface, or another member (not shown) meshed with the internal gear 24 may be disposed axially non-movably so as to be used as the braking surface.

The operating member 40 is disposed axially movably on the opposite side to the braking surface across the brake disk 30.

In this embodiment, the partition wall 52 of the inside member 51 of the housing 50 has a pocket 52c (see FIGS. 3(a) and 3(b)) for holding the operating member 40 axially movably but radially non-movably. The operating member 40 is held in the pocket 52c.

The brake operating shaft 60 is supported in a rotatable manner about the axis by the housing along the radial direction of the brake disk, in a manner operable from the outside, and the inner end thereof is provided with an engagement part 61 capable of engaging with the operating member 40.

The engagement part 61 is formed into a non-circular shape in a cross-sectional view as shown in FIG. 3(b), in order that the operating member 40 can be pushed and moved toward the brake disk 30 according to the rotation of the brake manipulation shaft 60 in any one of both directions about the axis.

In this way, the brake operating shaft 60 is disposed along the radial direction of the brake disk 30, and is so configured that the operating member 40 pushes and moves the brake disk 30 toward the braking surface according to the rotation of the brake operating shaft 60 in any one of both directions about the axis. This can improve the freedom in design of the link mechanism (see FIG. 1) for operating the brake operating shaft 60.

In particular, in this embodiment, the housing 50 supports the brake operating shaft 60 in a substantially vertical direction in the state of being connected to the corresponding main frame 111, as shown in FIGS. 1 and 2.

Accordingly, an arm 80 operating the brake operating shaft 60 about the axis can extend inwardly in the vehicle width direction. This can effectively prevent an interference between the arm 80 and the link mechanism connected to the arm 80, and the driving wheel 200.

Further, the arm 80 and the link mechanism 90 can be positioned between the pair of main frames 111 without any additional configuration, whereby the distance in the width direction of the vehicle as a whole can be reduced as short as possible. Moreover, it is possible to effectively prevent the arm 80 and the link mechanism 90 from colliding with the outer member during traveling of the vehicle and being damaged or broken.

Further, since the operating member 40 can be pushed and moved toward the brake disk 30 despite the brake operating shaft 60 being rotated in any direction about the axis, one type of housing can apply to either of the right and left pair of driving wheels 200, which enables to use common components.

More preferably, the brake operating shaft 60 may be so disposed that the upper end thereof is positioned above the upper end of the main frame 111.

With this configuration, various effects can be achieved while the arm 80 being configured simply.

Further, this embodiment is so configured that the inner end of the brake operating shaft 60 in the radial direction with respect to the input shaft 10 has a notch which serves as the engagement part 61, as shown in FIG. 2 for example.

In this way, by using the notch as the engagement part 61, the distance in the vehicle width direction of the brake mechanism including the brake operating shaft 60, the operating member 40, the brake disk 30 and the braking surface (in this embodiment, the end surface in the axial direction of the internal gear 24) can be reduced as short as possible. This enables to effectively miniaturize the reduction gear device as a whole.

Figure 5:
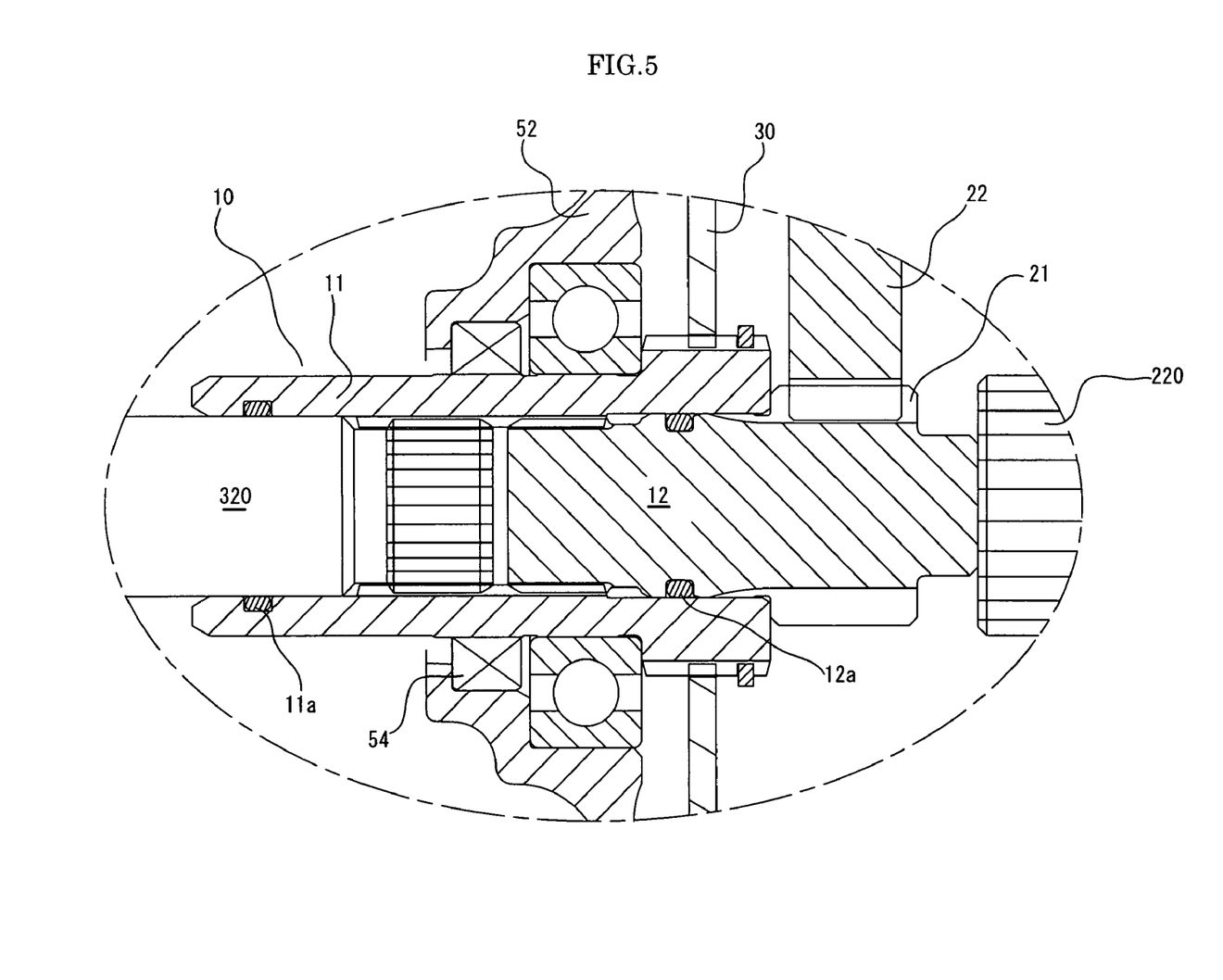
FIG. 5 is an enlarged sectional view of the vicinity of an input shaft of a reduction gear device in the reduction gear structure.

FIG. 5 shows an enlarged sectional view of the vicinity of the input shaft 10.

The input shaft 10 may take various configurations, provided that it can transmit the rotational output of the motor shaft 320 to the reduction gear unit 20.

In this embodiment, the input shaft includes: a hollow, first input shaft supported by the input shaft bearing hole 52a of the inside member 51 in a rotatable manner about the axis; and a second input shaft 12 which has a first end side (a side adjacent to the main frame 111) internally inserted into a second end side (a side adjacent to the driving wheel 200) of the first input shaft 11 in a relatively non-rotatable manner so as to be in a spline-engagement, and a second end side (a side adjacent to the driving wheel 200) positioned outside the first input shaft 11.

Particularly, the first input shaft 11 is supported by the housing 50 in such a manner that a first end side (a side adjacent to the main frame 111) is positioned outside the housing 50, and a second end side (a side adjacent to the driving wheel 200) is positioned inside the housing 50.

The first input shaft 11 is so configured that the motor shaft 320 internally inserted from the first end side of the first input shaft 11 is spline-engaged in a relatively non-rotatable manner, and the brake disk 30 is outwardly inserted to the splines engraved on the outer peripheral surface of the second end side of the first input shaft 11 in a relatively non-rotatable and axially movable manner.

The second input shaft 12 integrally includes a tooth part forming the sun gear 21 in the outer peripheral surface of the second end side.

Since the reduction gear device 1A according to this embodiment has such a configuration, the pitch diameter of the sun gear 21 can be shortened as small as possible. This makes it possible to miniaturize the planet gear unit as a whole while keeping the reduction ratio of the planet gear unit.

Of course, the san gear 21 may be formed as a separate member from the second input shaft 12. In such a case, the sun gear 21 is outwardly inserted onto the second end side of the second input shaft 12 in a relatively non-rotatable manner.

Further, on the outer peripheral surface of the intermediate part in the axial direction of the second input shaft 12, an O-ring 12a is mounted. The outer periphery of the O-ring 12a contacts the inner peripheral surface of the first input shaft 11 so as to keep liquid-tightly the inner space of the housing 50 in cooperation with the seal member 54 (see FIGS. 2 and 5).

Further, on the inner peripheral surface of the first end side of the first input shaft 11, an O-ring 11a is mounted. The inner periphery of the O-ring 11a contacts the outer peripheral surface of the motor shaft 320, so as to keep a lubricant oil for lubricating the respective spline-engaged parts of the motor shaft 320, the first input shaft 11, and the second input shaft 12, between the O-ring 11a and the O-ring 12a.

Further, in this embodiment, the sun gear 21 is slightly movable radially, whereby the load placed on the planet gear unit can be equally distributed.

In this embodiment, the sun gear 21 is formed integrally with the second end side of the second input shaft 12, as described above (see FIGS. 2 and 5). In such a configuration, the outer diameter of the second input shaft 12 is set to be slightly smaller than the inner diameter of the first input shaft 11, whereby the second input shaft 12 is inwardly inserted to the first input shaft 11 slightly movably in the radial direction.

In the present embodiment, the sun gear 21 is slightly movable radially so as to equally distribute the load placed on the planet gear unit. However, instead of or in addition to this configuration, it is possible to make the engagement between the internal gear 24 and the peripheral wall 56 of the housing 50 less accurately, to thereby make the internal gear 24 slightly movable radially.

Further, as shown in FIGS. 2 and 5, this embodiment is so configured that the end surface of the second end side of the second input shaft 12 contacts the end surface of the driving axle 220 in the state of being inwardly inserted in the hollow part 71 of the output member 70. Thereby, it is possible to prevent the second input shaft 12 and the sun gear 21 from moving axially.

Now, an explanation will be given for a steering wheel 250 in the vehicle 100. The vehicle 100 is a three-wheel drive car, including two front wheels and one rear wheel which is the steering wheel 250.

Figure 6:
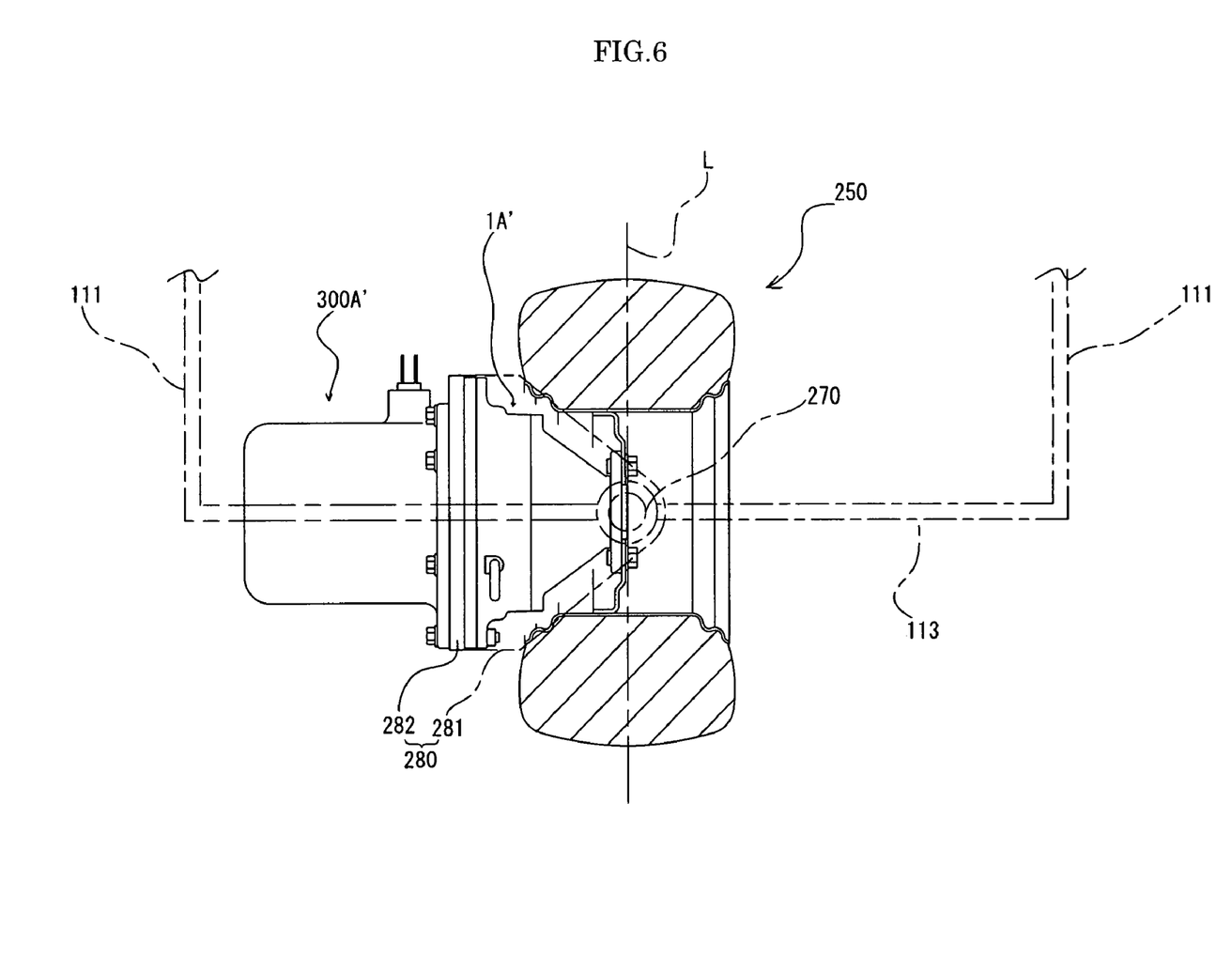
FIG. 6 is a plan view of the vicinity of a steering wheel of the vehicle.
Figure 7:
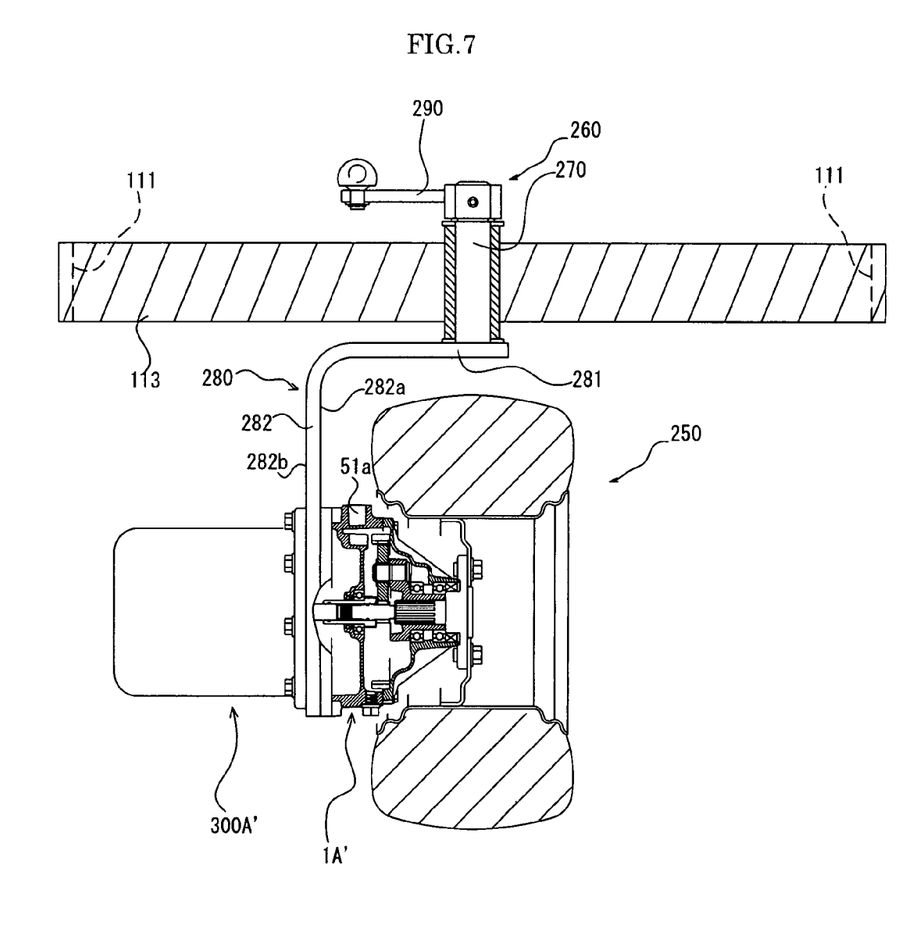
FIG. 7 is a partial longitudinal sectional view of the vehicle taken along the line passing through the steering wheel.

FIGS. 6 and 7 show a plan view and a partial longitudinal sectional view of the vehicle 100, respectively.

As shown in FIGS. 6 and 7, in the vehicle 100, the pivotal axis of the steering wheel 250 is located on the central longitudinal line L of the vehicle. The steering wheel 250 is made to be able to swing about the pivotal axis via the steering mechanism 260 and is driven via a dedicated motor unit 300A'.

Particularly, the steering mechanism 260 includes: a pivot shaft 270 supported by the second cross member 113 in a rotatable manner about the axis so as to be positioned on the central longitudinal line L of the vehicle and extend vertically; a supporting frame 280 connected to the lower end of the pivot shaft 270; and an arm 290 connected to the upper end of the pivot shaft 270.

The arm 290 is so configured that the base end thereof is connected to the upper end of the pivot shaft 270, and the free end thereof is connected to a handle via a steering mechanism (not shown) such as a power steering mechanism including a hydraulic cylinder or an electric motor.

The supporting frame 280 has a base part 281 extending from the lower end of the pivot shaft 270 in the vehicle width direction, and a supporting part 282 extending downwardly from the free end of the base part 281.

As aforementioned, in the vehicle 100, the steering wheel 250 is also driven by the dedicated motor unit 300A'.

Particularly, the supporting part 282 supports a reduction gear device 1A' for steering and driving wheel on a side surface 282a of the side adjacent to the base part 281, and supports the motor unit 300A' for steering and driving wheel on a side surface 282b opposite to the side surface 282a.

In this way, the motor unit 300A' for steering and driving wheel and the reduction gear device 1A' for steering and driving wheel are disposed distributively across the supporting part 282. This enables the supporting frame 280 to swing about the pivot shaft 270 comfortably.

The reduction gear device 1A' has a substantially identical configuration to that of the reduction gear device 1A according to this embodiment, except that the brake mechanism is not provided.

In this embodiment, in order to share the mold of the housing 50 between the reduction gear device 1A for non-steering and driving wheel with a brake mechanism, and the reduction gear device 1A' for steering and driving wheel without a brake mechanism, the brake operating shaft bearing hole is formed as a non-through hole 51a in which the inner end is closed, in the casting state.

That is, if it is used for the housing of the reduction gear device 1A' for steering and driving wheel, the non-through hole 51a is not perforated as it is in the casting state, and if it is used for the housing 50 of the reduction gear device 1A for non-steering and driving wheel, the non-through hole 51a is perforated after casting. In this way, the mold can be shared.

Embodiment 2

Hereinafter, another embodiment of the reduction gear structure according to the present invention will be described with reference to the accompanying drawings.

Figure 8:
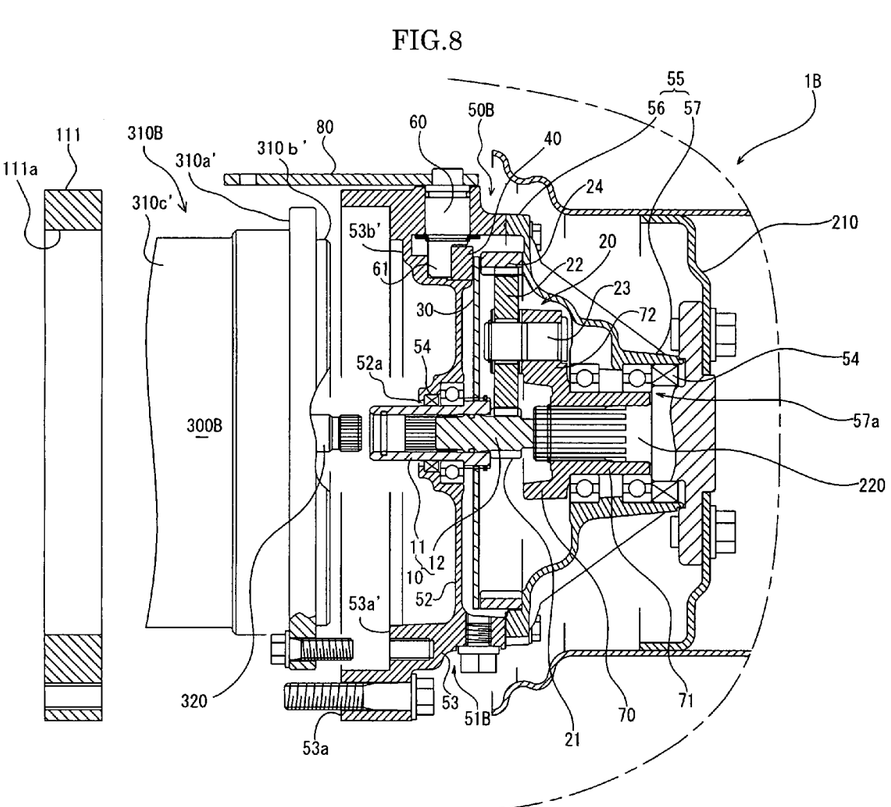
FIG. 8 is a longitudinal sectional view of a reduction gear device in a reduction gear structure according to another embodiment of the present application.

FIG. 8 shows a longitudinal sectional view of a reduction gear device in the reduction gear structure according to this embodiment.

In this embodiment, same or equivalent members to those of the first embodiment are denoted by the same reference numerals and the explanations thereof are omitted.

In the first embodiment, the motor unit 300A is connected to the inside surface of the main frame 111, and the reduction gear device 1A is connected to the outside surface of the main frame 111. On the other hand, a reduction gear device 1B according to this embodiment is connectable to the main frame 111 in the state of a motor unit 300B has been connected thereto.

Particularly, the motor unit 300B has a motor case 310B, instead of the motor case 310.

The motor case 310B includes: a body 310c', and a housing mounting seat 310a' provided at an end of the body 310c', on the side facing the reduction gear device 1B (an end located outward in the vehicle width direction).

The body 310c' has a smaller diameter than that of the opening 111a of the main frame 111. That is, the body 310c' can be inserted in the opening 111a.

The housing mounting seat 310a' is positioned outward in the radial direction of the body 310c'. The housing mounting seat 310a' has a bolt insertion hole into which a bolt for connecting the motor case 310B to the housing 50B is inserted.

The reduction gear device 1B has a housing 50B instead of the housing 50.

The housing 50B includes an inside member 51B and the outside member 55 connected to the inside member 511B.

The inside member 51B includes: the partition wall 52; the peripheral wall 53; the frame mounting seat 53a; and a motor mounting seat 53a' positioned inward in the radial direction of the frame mounting seat 53a and contacting the housing mounting seat 310a'.

In this embodiment, as shown in FIG. 8, the motor mounting seat 53a' is positioned outward in the vehicle width direction (a direction separated from the main frame 111) from the frame mounting seat 53a, to thereby prevent the housing mounting seat 310a' from interfering with the main frame 111 when the housing 50B is connected to the main frame 111.

The present embodiment is so configured that the motor case 310B and the housing 50B are connected to each other via the concave-convex engagement, similar to those of the first embodiment.

Particularly, the motor case 310B has a housing connecting part 310b' inward in the radial direction of the housing mounting seat 310a'.

On the other hand, the housing 50B has a motor connecting part 53b' inward in the radial direction of the motor mounting seat 53a'.

The housing connecting part 310b' and the motor connecting part 53b' are connected via the concave-convex engagement in which the convex shape of one of the housing connecting part 310b' and the motor connecting part 53b' is inserted into the concave shape of the other of them in the state of the motor case 310B and the housing 50B being connected.

Although, in this embodiment, the housing connecting part 310b' is protruded and the motor connecting part 53b' is recessed, they may take opposite shapes, of course.

In this embodiment as described above, the frame mounting seat 53a is positioned outward in the radial direction of the motor mounting seat 53a', whereby the distance in the radial direction of the housing 50B becomes slightly longer.

However, it is possible that the reduction gear device 1B and the motor unit 300B are connected first, and then the connected assembly can be mounted on the frame 111. This makes it possible to simplify the manufacturing management in transmission manufacturers and vehicle manufacturers.

That is, transmission manufacturers can perform adjusting operation before shipping in the state where the reduction gear devices 1B are connected to the motor units 300B. Further, vehicle manufacturers only have to mount the connected assemblies consisting of the reduction gear devices 1B and the motor units 300B on the frames, whereby the assembling operation of the driving system is simplified.

This specification is by no means intended to restrict the present invention to the preferred embodiments set forth therein. Various modifications to the reduction gear structure as described herein, may be made by those skilled in the art without departing from the spirit and scope of the present invention as defined in the appended claims.

What is claimed is:

1. A reduction gear structure applied to a vehicle having a motor unit with a motor shaft for outputting a driving force for driving a driving wheel and a reduction gear device, wherein said reduction gear device includes:
   an input shaft operatively connected to said motor shaft;
   a reduction gear unit operatively connected to said input shaft;
   a brake disk supported by said input shaft in a relatively non-rotatable and axially movable manner;
   an operating member for pushing and moving said brake disk toward a braking surface;
   a housing for accommodating said reduction gear unit, said brake disk and said operating member; and
   a brake operating shaft which is supported rotatably about an axis by said housing along a radial direction of said brake disk and has an engagement part engaging with said operating member, wherein
   the engagement part of said brake operating shaft is formed into a non-circular shape in a cross-sectional view, in order that said operating member pushes and moves said brake disk according to the rotation of said brake operating shaft in any one of both directions about the axis.

2. The reduction gear structure according to claim 1, wherein
   said housing is supported by a side surface, facing a driving wheel, of a main frame, said main frame extending in a longitudinal direction of the vehicle,
   said motor unit is disposed opposite to said driving wheel across said main frame, and
   said brake operating shaft extends in a substantially vertical direction in a state that said housing is supported by said main frame.

3. The reduction gear structure according to claim 2, wherein
   an upper end of said brake operating shaft is positioned above an upper end of said main frame in the state that said housing is supported by said main frame.

4. The reduction gear structure according to claim 1, wherein
   said reduction gear unit is a planet gear unit having a sun gear operatively connected to said input shaft, a planet gear meshed with the sun gear so as to be able to revolve about the sun gear, a carrier which supports the planet gear in a relatively rotatable manner and revolves about said sun gear according to a revolution of the planet gear, and an internal gear meshed with said planet gear, and said internal gear is a fixed element while said carrier is an output element.

5. The reduction gear structure according to claim 4, wherein
an end surface in an axial direction of said internal gear serves as said braking surface.

6. The reduction gear structure according to claim 4, wherein
said internal gear is detachable from said housing, and
said housing is so configured as to support said internal gear in a non-rotatable manner about an axis of said sun gear.

7. The reduction gear structure according to claim 6, wherein
said housing is so configured as to support said internal gear in a radially movable manner with reference to the axis of said sun gear.

8. The reduction gear structure according to claim 4, wherein
said input shaft includes a hollow, first input shaft which is supported by said housing in a rotatable manner about an axis and into which said motor shaft is inwardly inserted from a first end side thereof in a relatively non-rotatable manner, and a second input shaft which has a first end side inwardly inserted into said first input shaft from a second end side of said first input shaft in a relatively non-rotatable manner, and a second end side positioned outward the first input shaft, and
said brake disk is outwardly inserted onto the second end side of said first input shaft in a relatively non-rotatable manner, while said sun gear is supported by the second end side of said second input shaft in a relatively non-rotatable manner or integrally formed therewith.

9. The reduction gear structure according to claim 8, wherein
said second input shaft is inwardly inserted into said first input shaft such that said sun gear is movable radially.

10. The reduction gear structure according to claim 8, further comprising:
an output member which rotates about an axis of said sun gear according to the revolution of said carrier, wherein
said output member has a hollow part which is disposed substantially coaxially with said sun gear and into which a driving axle of said driving wheel is inwardly inserted in a relatively non-rotatable manner, and
said second end side of said second input shaft contacts an end surface of said driving axle in a state of being inwardly inserted into said hollow part.

11. A reduction gear structure applied to a vehicle having a main frame extending along a longitudinal direction of the vehicle, a driving wheel supported by the main frame, a motor unit having a motor shaft for outputting a driving force for driving the driving wheel and being disposed opposite to said driving wheel across said main frame, and a reduction gear device, wherein said reduction gear device includes:
an input shaft operatively connected to said motor shaft;
a reduction gear unit operatively connected to said input shaft; and
a housing for accommodating said reduction gear unit, wherein
said main frame has an opening penetrating a first side surface facing a driving wheel and a second side surface opposite to the first side surface, wherein
said housing includes a motor connecting part with a diameter smaller than that of the opening of said main frame, and a frame mounting seat which is positioned outward in a radial direction of the motor connecting part and contacts the first side surface of said main frame, said motor unit includes a housing connecting part with a diameter smaller than that of the opening of said main frame, and a frame mounting seat which is positioned outward in a radial direction of the housing connecting part and contacts the second side surface of said main frame, and one of the motor connecting part of said housing and the housing connecting part of said motor unit is formed into a convex shape, and the other of the housing connecting part of said motor unit and the motor connecting part of said housing is formed into a concave shape into which the one having the convex shape can be inserted.

12. The reduction gear structure according to claim 11, wherein
the housing connecting part of said motor unit is in a convex shape capable of being inserted into the opening of said main frame, and
the motor connecting part of said housing is in a concave shape into which said convex-shaped connecting part of said motor unit can be inserted.

13. The reduction gear structure according to claim 12, wherein
the convex-shaped connecting part of said motor unit is so configured that a tip end thereof protrudes outward in a vehicle width direction from the first side surface of said main frame.

14. A reduction gear structure applied to a vehicle having a main frame extending along a longitudinal direction of the vehicle, a driving wheel supported by the main frame, a motor unit having a motor shaft for outputting a driving force for driving the driving wheel, and a reduction gear device, wherein said reduction gear device includes:
an input shaft operatively connected to said motor shaft;
a reduction gear unit operatively connected to said input shaft; and
a housing for accommodating said reduction gear unit, wherein
said main frame has an opening penetrating a first side surface facing a driving wheel and a second side surface opposite to the first side surface,
said motor unit has a motor case supporting said motor shaft, the motor case including a case body capable of being inserted into said opening, and a housing mounting seat disposed on an end of a side, facing said reduction gear unit of the case body, and
said housing includes a frame mounting seat contacting the first side surface of said main frame, and a motor mounting seat which is positioned inward in a radial direction of the frame mounting seat and contacts said housing mounting seat.

15. The reduction gear structure according to claim 14, wherein
said motor case has a housing connecting part inward in a radial direction of said housing mounting seat,
said housing has a motor connecting part inward in a radial direction of said motor mounting seat, and
one of said motor connecting part and said housing connecting part is formed into a convex shape, and the other of said housing connecting part and said motor connecting part is formed into a concave shape into which the one having the convex shape can be inserted.

* * * * *

UNITED STATES PATENT AND TRADEMARK OFFICE
CERTIFICATE OF CORRECTION

PATENT NO. : 7,325,643 B2  Page 1 of 1
APPLICATION NO. : 11/026104
DATED : February 5, 2008
INVENTOR(S) : Shimizu et al.

It is certified that error appears in the above-identified patent and that said Letters Patent is hereby corrected as shown below:

Title Page, Item (54) and Col. 1, Line 1, Title of the Invention reading "Reduction Gear Device" should read --Reduction Gear Structure--.

Signed and Sealed this

Eleventh Day of November, 2008

JON W. DUDAS
*Director of the United States Patent and Trademark Office*